L. W. PARKHURST.
SAW SET.
APPLICATION FILED MAY 1, 1908.

971,141.

Patented Sept. 27, 1910.
2 SHEETS—SHEET 1.

WITNESSES:
O. R. Erwin
J. D. Bremer

INVENTOR
Lemuel W. Parkhurst
By Erwin & Wheeler
ATTORNEYS.

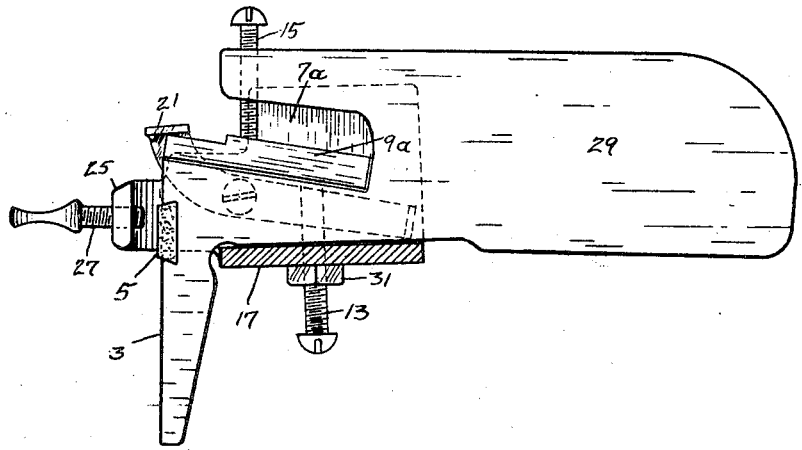

UNITED STATES PATENT OFFICE.

LEMUEL W. PARKHURST, OF ELMA, WASHINGTON.

SAW-SET.

971,141.   Specification of Letters Patent.   Patented Sept. 27, 1910.

Application filed May 1, 1908. Serial No. 430,262.

*To all whom it may concern:*

Be it known that I, LEMUEL W. PARKHURST, a citizen of the United States, residing at Elma, county of Chehalis, and State of Washington, have invented new and useful Improvements in Saw-Sets, of which the following is a specification.

My invention relates to improvements in saw sets.

The object of my invention is to provide a simple and convenient device, which can be quickly adjusted to a saw in the exact position required for properly bending the saw tooth, the tool being capable of different adjustments whereby the degree of set may be varied.

In the following description, reference is had to the accompanying drawings in which,—

Figure 1:
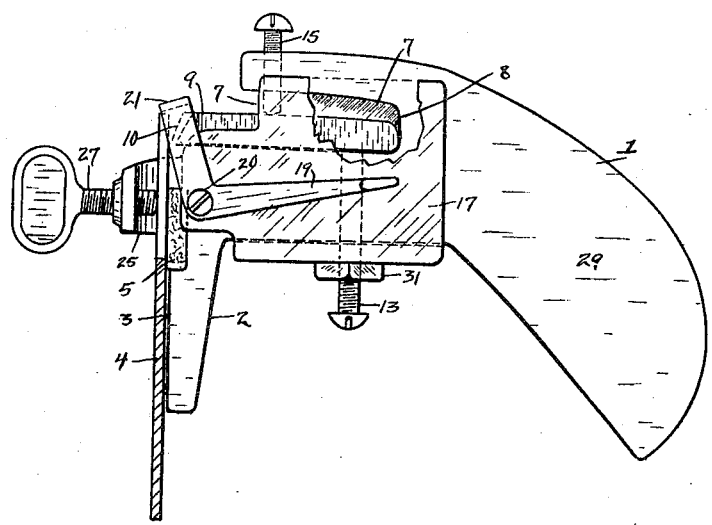
Figure 2:
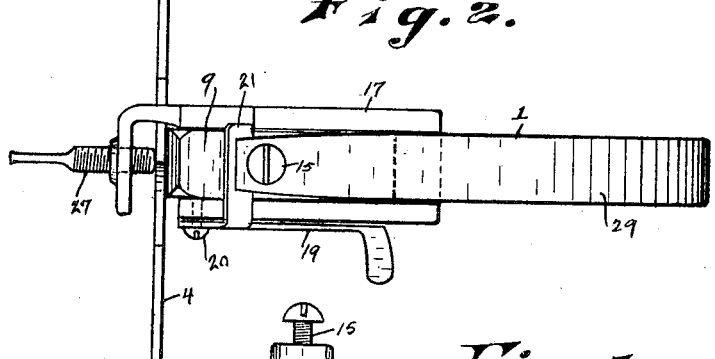
Figure 3:
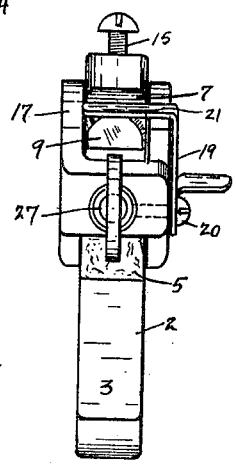

Figure 1 is a side view of my invention, showing the saw in section, a portion of the side wall of the casing being partially broken away. Fig. 2 is a plan view of the same. Fig. 3 is an end view. Fig. 4 is a side view showing a modified construction.

Like parts are identified by the same reference characters throughout the several views.

The body portion 1 of my improved saw set is provided with a downwardly projecting arm 2, the outer surface 3 of which is faced to receive the saw blade 4, this face 3 being provided with a recess, which is filled with rawhide 5, or other similar material suitable for frictional contact with the saw blade. A socket 7 is formed in the upper portion of the body and extends inwardly from the saw receiving end thereof and is provided with a rounded surface 8 at its inner end. This socket is adapted to receive an adjustable bar 9, the outer end of which is beveled upwardly and inwardly as shown at 10 in Fig. 1, and the inner end of which is rounded and adapted to bear upon the concavely rounded surface 8. This bar 9 is of less thickness in the vertical dimension than the diameter of the socket 7, thus permitting either end of the bar to be raised or lowered in the socket. The position of the bar in the socket is regulated by the screws 13 and 15. The screw 13 extends upwardly through the body and is adapted to bear on the under surface of the bar 9 near its rear end. The screw 15 extends downwardly in the body portion and bears upon the upper surface of the bar 9 at a point nearer the saw blade than the screw 13. The under surface of the member 9 terminates substantially in the plane of the vertical facing 3 of the arm 2 and the end of the body 1.

A casing 17, preferably U shaped in cross section, is adjusted to the body from the under side and covers the rear portion of the socket 7, thus preventing the bar 9 from slipping laterally. An elbow lever or bell crank 19 is pivoted to the casing 17 at 20 and an upwardly projecting arm of this lever is provided with a lip 21, which is adapted to be swung over the plane of the saw blade, when the tool is being adjusted to such blade. On the opposite side of the body, the casing is provided with an L shaped arm 25, which is adapted to extend between the saw teeth and laterally in front of the body 1 to form a support for the clamping set screw 27, which set screw serves to clamp the saw blade against the face 3. The rear end of the body is preferably extended angularly to form a handle 29.

In operation, the tool is adjusted to the saw blade with the face 3, bearing against one side thereof and the point of the tooth engaging the lip 21 of the lever 19, this lever being then in the position in which it is shown in Fig. 1. The clamping set screw 27 is then turned inwardly to clamp the tool upon the blade in this position, after which the lever 19 is actuated to swing the lip 21 inwardly to the socket 7, thus exposing the point of the tooth in a position to be struck by a hammer and bent inwardly against the surface 10.

To vary the degree or angle of the set, the screws 13 and 15 are adjusted as above explained. A lock nut 31 is preferably employed in connection with the screw 13. The object of the downwardly projecting arm 2 is to provide an elongated bearing against the saw blade without increasing the vertical dimension of the body portion to an extent which would make it clumsy in operation. The object of the casing 17 is to facilitate forming the socket 7 and arm 25. The casing is formed of sheet metal bent in the desired shape, while the body portion preferably comprises a piece of cast metal. The bar 9 is preferably formed of steel or other hardened material and consists of a separate piece, which can easily be removed or adjusted to any desired position.

Referring to Fig. 4 it will be observed that the socket 7ª is formed at an angle sloping downwardly from the face 3 into the body. With this form of recess, the bar 9ª may be squared at both ends, as the pitch of the socket will cause the end of the bar to assume an angular position. With this construction, also the bar is reversible and one end is preferably made thinner than the other, the thinner end being used for saws with small teeth. The screws 13 and 15 and all the other parts may be the same as in the other views.

Having thus described my invention, what I claim as new and desire to secure by Letters Patent is,—

1. A saw set comprising a body portion faced off at one end to fit against the side of a saw blade and provided with a socket, extending inwardly from said end near the upper margin of the body; an adjustable member loosely fitting said socket and provided with an outer end, coinciding with the end of the body and extending upwardly and inwardly therefrom, a retaining casing member inclosing said socket at the sides and adapted to hold the adjustable member against lateral movements and means for clamping said device to the saw blade.

2. A saw set comprising a body portion faced off at one end to fit against the side of a saw blade and provided with a recess extending inwardly from said end near the upper margin of the body, a retaining casing member U-shaped is cross section and arranged to embrace the under surface and sides of said body and to form side walls for said recess, an adjustable member loosely fitting said recess and provided with a beveled outer end, co-inciding with the end of the body and extending upwardly and inwardly therefrom, a set screw extending upwardly through said casing member and arranged to bear upon the rear portion of said adjustable member, and another set screw extending downwardly through the body and arranged to bear on the upper surface of said adjustable member between the first mentioned set screw and said beveled end.

3. The combination with a body socketed at one end near its upper margin and provided with a downwardly extending arm, having one face forming part of the saw receiving body, a casing partially inclosing the body and forming the side walls of said socket, a bar loosely mounted in said socket with the front end of its under surface coinciding with the end of the body above said arm and having a beveled end, extending upwardly and inwardly from the end of the body, a set screw extending upwardly through the body and adapted to bear upon said bar near its inner end, another set screw extending downwardly through the body and adapted to bear upon said bar between the first mentioned set screw and the outer end of the bar, and a clamping device supported from the casing by an arm adapted to pass between the saw teeth and adapted to bind the body against a saw blade with the point of a tooth opposite the beveled end of said bar.

4. The combination with a body, socketed at one end near its upper margin and provided with a downwardly extending arm, having one face forming part of the saw receiving body, a casing partially inclosing the body and forming the side walls of said socket, a bar loosely mounted in said socket, with the front end of its under surface coinciding with the end of the body above said arm and having a beveled end, extending upwardly and inwardly from the end of the body, a set screw extending upwardly through the body and adapted to bear upon said bar near its inner end, another set screw extending downwardly through the body and adapted to bear upon said bar between the first mentioned set screw and the outer end of the bar, and a clamping device, adapted to bind the body against a saw blade with the point of a tooth opposite the beveled end of said bar.

In testimony whereof I affix my signature in the presence of two witnesses.

LEMUEL W. PARKHURST.

Witnesses:
ADA M. ESTEE,
E. L. MINARD.